R. MARX.
CONTROLLER REGULATOR.
APPLICATION FILED MAR. 15, 1912.
1,074,512.
Patented Sept. 30, 1913.
3 SHEETS—SHEET 1.
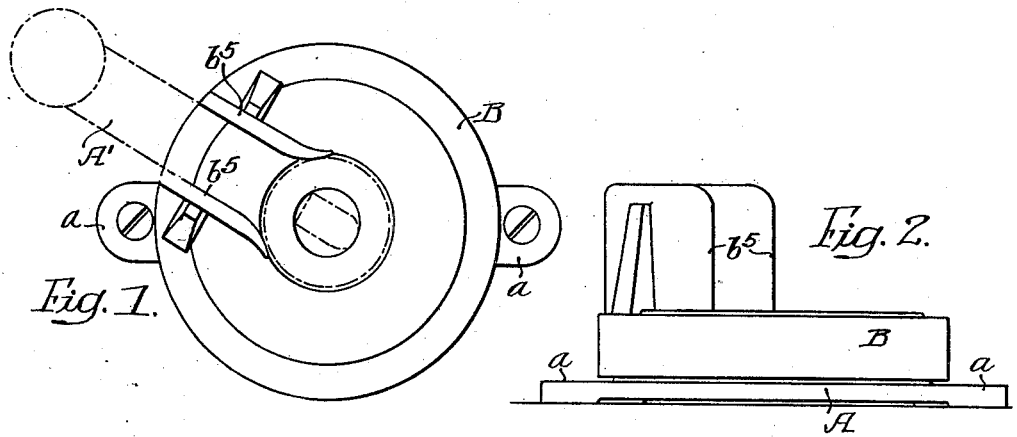
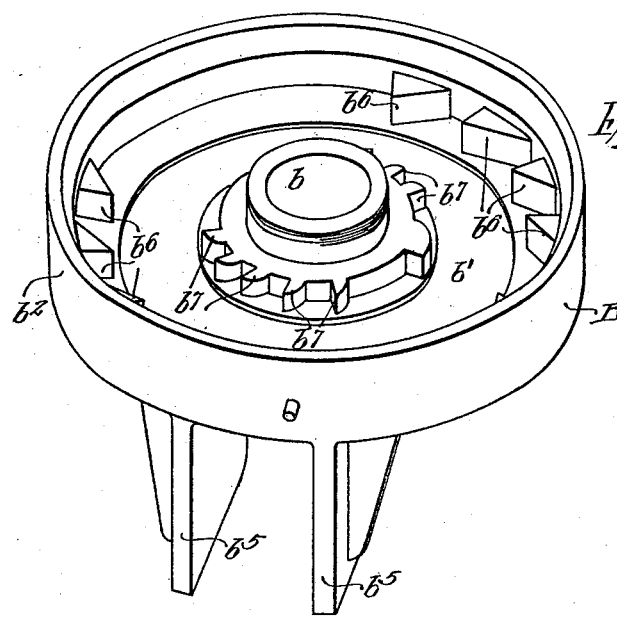
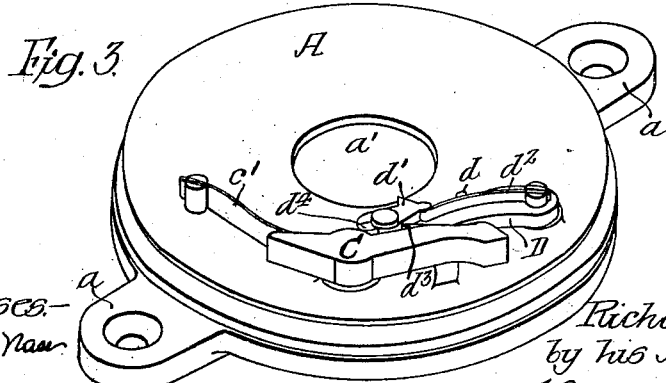
Inventor:
Richard Marx.
by his Attorneys
Howson & Howson R. MARX.
CONTROLLER REGULATOR.
APPLICATION FILED MAR. 15, 1912.
1,074,512.
Patented Sept. 30, 1913.
3 SHEETS—SHEET 2.
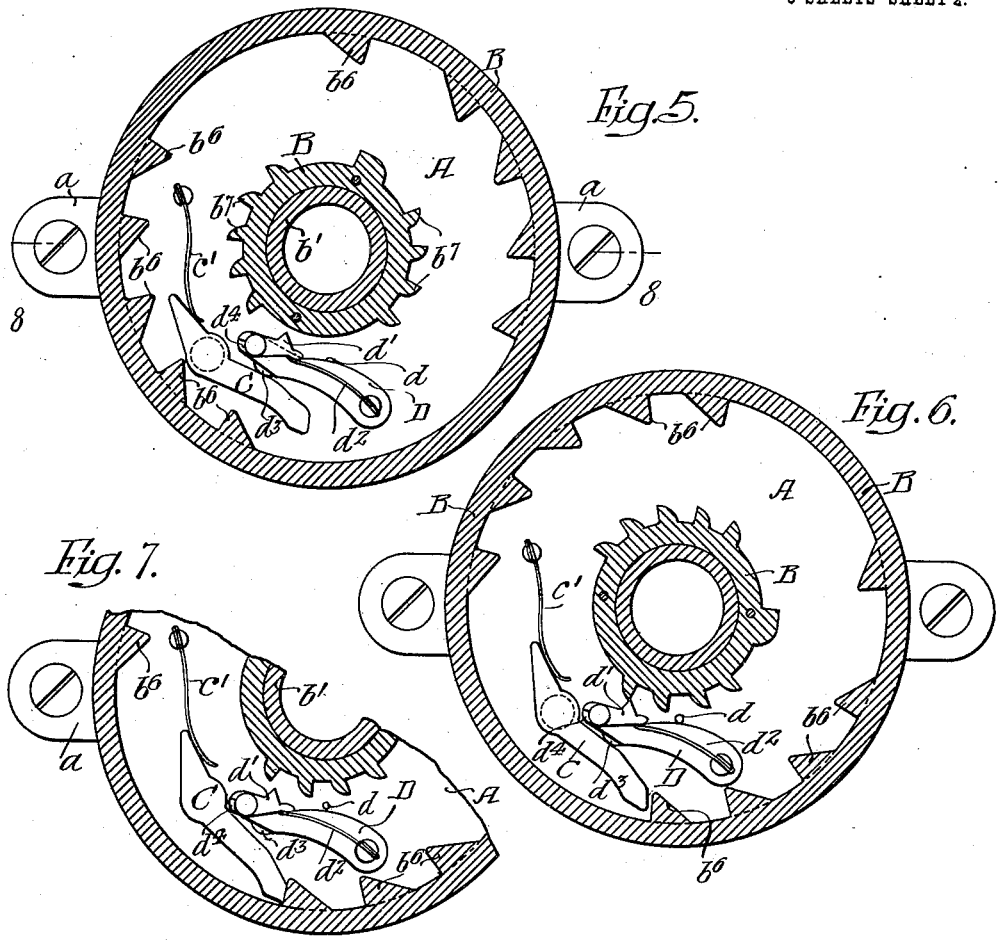
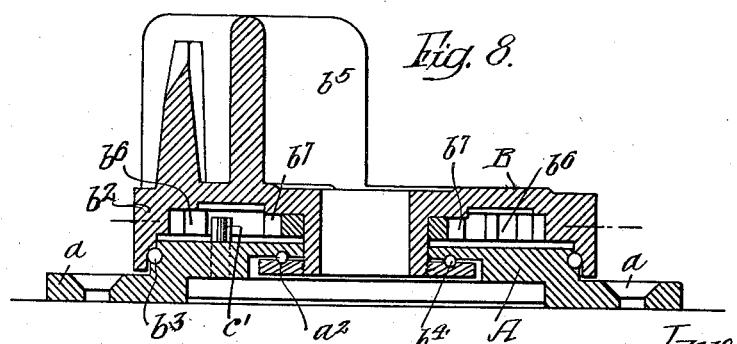

R. MARX.
CONTROLLER REGULATOR.
APPLICATION FILED MAR. 15, 1912.
1,074,512.
Patented Sept. 30, 1913.
3 SHEETS—SHEET 3.
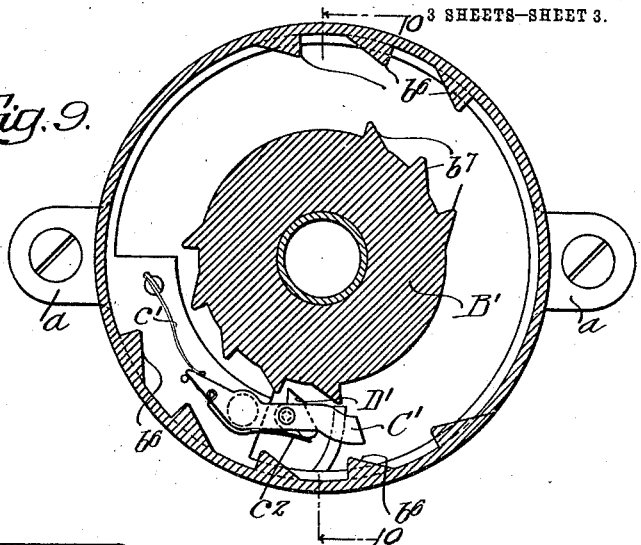
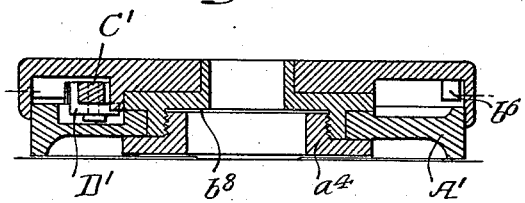
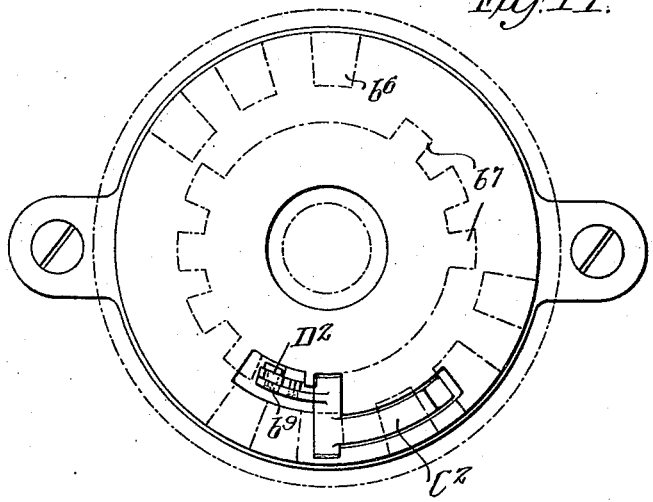
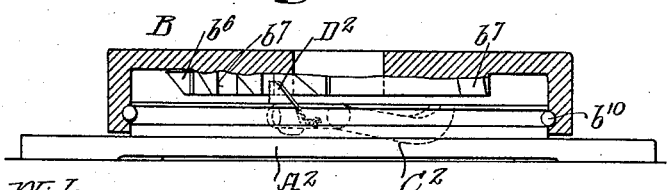
Witnesses:—
William T. Nase
Willet Bimone
Inventor:—
Richard Marx.
by his Attorneys,
Howson & Howson

UNITED STATES PATENT OFFICE.

RICHARD MARX, OF PHILADELPHIA, PENNSYLVANIA, ASSIGNOR TO DEFIANCE MANUFACTURING COMPANY, OF PHILADELPHIA, PENNSYLVANIA, A CORPORATION OF PENNSYLVANIA.

CONTROLLER-REGULATOR.

1,074,512.  Specification of Letters Patent. Patented Sept. 30, 1913.

Application filed March 15, 1912. Serial No. 683,955.

*To all whom it may concern:*

Be it known that I, RICHARD MARX, a citizen of the United States, residing in Philadelphia, Pennsylvania, have invented certain Improvements in Controller-Regulators, of which the following is a specification.

My invention relates to that particular class of devices for connection to the handle of a controller for regulating the supply of current to an electric motor or other current receptive device, so that such controller cannot be operated at more than certain predetermined speeds; one object of the invention being to provide a regulator, which, while being simple and substantial in construction, shall be certain in operation, rendering it necessary for the controller handle to be brought to a full stop and then moved slightly back at each of the so-called "points" before it can be moved to the next "point" in advance.

I further desire to provide improved means whereby certain of the members of my controller regulator are held together and in proper operative relations, with a view to making the structure water as well as dust proof and at the same time permitting it to be operated by the expenditure of a minimum of energy.

These objects and other advantageous ends I secure as hereinafter set forth, reference being had to the accompanying drawings, in which:—

Figure 1, is a plan view of the preferred form of my improved controller regulator; Fig. 2, is a side elevation of the regulator shown in Fig. 1; Fig. 3, is a perspective view of the fixed or base member of the regulator; Fig. 4, is an inverted perspective view of the upper or rotatable member of the preferred form of my regulator; Figs. 5, 6, and 7 are horizontal sections illustrating not only the interior construction of the controller regulator embodying my invention but showing its parts in the positions occupied at various stages of its operation; Fig. 8, is a vertical section on the line 8—8, Fig. 5; Fig. 9, is a horizontal section of a modified form of my controller regulator; Fig. 10, is a vertical section on the line 10—10, Fig. 9; Fig. 11, is a plan of the base member belonging to a second modification of my invention; Fig. 12, is a side elevation, partly in section, of the form of regulator shown in Fig. 11; and Fig. 13, is a perspective view of the pawl employed in the device shown in Figs. 11 and 12.

In the above drawings, A represents the base member of the preferred form of my invention, and this consists of a disk-like structure having lugs $a$ for the reception of screws of bolts whereby it may be rigidly held to the top plate or cover of a controller, such for example as is commonly employed on street cars. This member A has a relatively large central opening $a'$ designed for the reception of an externally threaded flange $b$ which projects inwardly around the central opening formed in the movable member B. This latter consists of a substantially circular disk portion $b'$ having an external downwardly extending flange $b^2$ so that it fits over and forms with the base member A a hollow container; its central flange having screwed upon it a nut $a^2$ so that it is movably mounted upon and yet is inseperably held to said base member. To facilitate its movement upon this member I provide a series of balls $b^3$ operating in suitable race-ways formed respectively in the external flange $b^2$ and in a shouldered portion of the periphery of the member A. There are in addition a second set of balls $b^4$ between the nut $a^2$ and the under face of the member A, so that the member B is not only free to be moved with the utmost ease but is effectually prevented from uneven wear due to any tendency it might otherwise have to tilt out of the horizontal.

The spindle of the controller to which my device is applied extends though the centrally flanged opening in the member B, and receives the customary controller handle, indicated in dotted lines at A';—there being on the top face of the member B two upwardly extending guide pieces $b^5$ between which said handle fits so as to transmit its movement to said member. On the upper face of the fixed member A and in suitable position to co-act with the teeth on the member B hereafter described, I mount a pawl C, this being in the present instance in the form of a lever of the first degree, since it has a downwardly extending stem, indicated in dotted lines in Figs. 5 and 6, whereby it is pivotally supported. Acting on one of its arms is a spring $c'$ tending to normally keep its second arm swung inwardly. This second arm of the pawl is designed to co-act with inwardly projecting teeth $b^6$ formed on the inner face of the external flange $b^2$, and is capable, when swung outwardly, of engaging said teeth and preventing movement of the member B in one direction. Also pivotally mounted on the upper face of the member A and adjacent to the pawl C, is a lever D whose inward movement is limited by a stop $d$ projecting from the face of the member A, and which adjacent to one of its ends bears upon the pawl C. Said lever has pivotally mounted upon its end farthest from its pivot a pawl $d'$ normally pressed inwardly by a spring $d^2$ carried by the lever and limited as to its outward movement by an upwardly projecting piece $d^3$ forming part of or carried by the lever. Its inward movement is likewise limited by a second upwardly projecting piece $d^4$. Mounted upon or formed as part of the central flange which surrounds the opening $b$ of the member B is a second series of outwardly projecting teeth $b^7$, placed in definite positions relatively to the teeth $b^6$, as hereafter noted.

It will be understood that in the operation of an electric controller, particularly of the types employed on electric railway cars, it is advisable that a definite time be permitted to elapse after each electrical combination of apparatus has been made, or that the controller be permitted to remain on each point until the motor or motors governed therefrom shall have acquired the speed properly resulting from the combinations made on such points. I therefore provide the same number of teeth $b^6$ as there are points on the controller to which my device is applied, and so arrange the vertical faces of said teeth that they bear the same angular relations to each other or are spaced the same angular distance apart as are the points on the controller. There are the same number of teeth $b^7$ and these are similarly separated by the same angular spaces as are the teeth $b^6$, except that it will be noted that their faces are inclined oppositely to those of the latter teeth.

Under normal conditions, with the controller in its off position, the various parts are as shown in Fig. 5, and if the controller handle be then moved so as to bring the controller to its first point, the beveled face of the first of the teeth $b^7$ is brought into engagement with the inclined face of the pawl $d'$ carried by the lever D, and because said pawl is so mounted that when thus engaged it cannot turn on its pivot, it, with the lever D, is swung outwardly. Since this lever engages the pawl C, it also will swing out, and just as this first tooth is passing the pawl $d'$, the various parts occupy the relative positions illustrated in Fig. 6. Under these conditions the end of the pawl C extends immediately in front of the vertical face of the first of the teeth $b^6$, so that when the pawl $d'$ with the lever D would otherwise be free to swing inwardly to their normal positions, said pawl C is caught by the first tooth $b^6$, as shown in Fig. 7, and the further forward turning of the controller handle is thereby effectually prevented. This action necessarily takes place regardless of the speed at which the controller handle is moved, it being just as certain to occur and just as positive in operation whether the handle be moved slowly or turned at a high velocity.

In order that the handle after being stopped as above noted, may be free to move to the next point, it is turned back through a very slight angle, which will be seen to depend on the amount of movement necessary to permit the pawl C to swing inwardly under the action of the spring $c'$ past the first tooth $b^6$ which action is rendered possible by reason of the fact that the pawl $d'$ has been passed by the first of the teeth $b^7$. It may then be turned to the next point where the same action is repeated, as well as at each one of the points as long as the controller handle is fed forward or until its movement is arrested by its engagement with the well known stop on the controller cover. As is obvious, the handle may be moved backward to its off position from any other position without any necessity of its pausing, since in so doing the vertical faces of the teeth $b^7$ engage the pawl $d'$ and turn it on its pivot without swinging the lever D or disturbing the pawl C. That is to say, on the forward movement of the controller handle the engagement of each of the teeth $b^7$ with the pawl $d'$ presses it bodily outward without turning it on its pivot and therefore swings outwardly the end of the lever D. On the reverse movement of the handle, however, the curved faces of the teeth $b^7$ act as cams when they are brought into engagement with the second of the beveled faces of the pawl $d'$ and cause this to turn on its pivot without moving said lever D; the above actions being due to the peculiar mounting and formation of the several parts.

The construction of my device may be further simplified, if desired, by making the main pawl as indicated at $C'$ in Fig. 9, in which case it has pivoted to it an auxiliary pawl $D'$. This latter is normally held in a definite position by means of a spring $c^2$ mounted on the pawl $C'$; the action of the device, however, being the same as described in connection with the other forms of my invention, since when the member $B'$ is fed forward, one of the teeth $b^7$ engages the auxiliary pawl D', and swings the pawl C' into the path of one of the teeth $b^6$. Said pawl C' cannot swing back into its normal position even after the pawl D' has passed the tooth $b^7$, but engages the vertical face of the tooth $b^6$ so as to arrest forward movement of the member B' and the controller spindle attached thereto, until such time as these parts have been moved back a sufficient distance to permit the end of the pawl clearing said tooth. While in this case I may employ the ball bearings shown in the other figures, I preferably fix to the member B' an interiorly threaded collar $b^8$ which projects through the base member A' and has threaded into it a nut $a^4$.

If desired, I may so arrange the pawls as to permit of their action and restoration to their normal positions under the action of gravity, in which case I construct my device as illustrated in Figs. 11 to 13 inclusive, where the base member $A^2$ carries the pawl $C^2$ in such manner that this is free to oscillate on a horizontal axis. As before, there are two sets of teeth on the movable member B and of these the teeth $b^6$ are formed so as to project downwardly from the inner faces of the member $D^2$, as are also the teeth $b^7$, although the latter are placed in a circle nearer the center of said member than the first set of teeth.

The pawl $C^2$ is so mounted that the main engaging portion overbalances and normally maintains in a normal position an arm $b^9$ attached to and formed as part of it. This arm carries the auxiliary pawl $D^2$ which is caused to project into the path of the inner set of teeth $b^7$, being maintained in place either solely by gravity or by a small spring. When the member B is turned the first of these latter teeth engage the auxiliary pawl $D^2$ and so swing the pawl $C^2$ that its opposite end is projected in front of one of the teeth $b^6$, from which position it is not free to drop even after said tooth $b^7$ has passed the auxiliary pawl. As before, it is necessary to actually move the member $B^2$ backward through a small angle before the pawl $C^2$ will drop under the action of gravity and permit of the controller being operated to its next point.

While the members $A^2$ and B may be held together by one of the constructions employed in the other forms of my invention, I may in this instance provide them with a set of ball bearings, indicated at $b^{10}$, which not only serve to lessen the friction between said members but also act to lock them together. For this purpose the race-ways are so constructed in each of the two members that after the balls have been introduced they prevent separation thereof.

I claim—

1. The combination of a fixed and a movable member, one member having two sets of teeth, with two coöperating pawls on the other member placed to respectively engage the teeth of said two sets, the tooth engaging portion of one of said pawls being movable relatively to the remainder thereof and the teeth of one set being capable of causing said pawl to force the other into position to be engaged by the teeth of the second set when said members are relatively moved.

2. A controller regulator consisting of two relatively movable members; two sets of teeth; means including two pawls coöperating with said teeth for connecting said members to each other after one of them has been moved a predetermined distance in one direction, means for causing one of said pawls to automatically disconnect said members when one of the latter is moved for a predetermined distance in the opposite direction after each connection, and the other pawl including two relatively movable parts respectively coöperating with one set of teeth and with the first pawl.

3. A controller regulator consisting of two members of which one is provided with two series of teeth, and two pawls mounted on the other member so as to respectively coöperate with said teeth, means for causing one of said pawls to act on the other pawl to cause movement thereof when the toothed member is moved in one direction, and a pivotally mounted tooth for said pawl placed to coöperate with the teeth of one series, the first pawl being movable independently of the second pawl when said member is moved in the opposite direction.

4. A controller regulator consisting of two members of which one has two sets of concentric teeth, with two coöperating pawls connected to the other member and placed to respectively coöperate with said two sets of teeth, one of said pawls having a movably mounted tooth capable of limited movement in one direction and placed to coöperate with the teeth of one set to cause its supporting pawl to move the other pawl into engagement with the teeth of the second set.

5. A controller regulator consisting of two relatively movable members of which one is provided with two sets of oppositely facing teeth and the other is provided with two pawls placed to respectively engage said teeth, with means for mounting one of said pawls so that when its supporting member is moved in one direction it causes movement of the second pawl into the path of the second set of teeth and when said member is moved in a reverse direction it is moved by the first set of teeth without operatively affecting the second pawl.

6. A controller regulator consisting of two relatively movable members of which one is provided with two sets of teeth lying in substantially the same plane and the other is provided with a plurality of pawls lying in the plane of said teeth and capable of co-acting therewith to automatically cause one of the members to be intermittently attached to and released from the other member as one of the members is properly moved relatively to the other.

In testimony whereof, I have signed my name to this specification, in the presence of two subscribing witnesses.

RICHARD MARX.

Witnesses:
WILLIAM E. BRADLEY,
WM. A. BARR.

Copies of this patent may be obtained for five cents each, by addressing the "Commissioner of Patents, Washington, D. C."